US012689056B2

(12) United States Patent
Lu et al.

(10) Patent No.: US 12,689,056 B2
(45) Date of Patent: Jul. 21, 2026

(54) BATTERY

(71) Applicant: AESC Japan Ltd., Kanagawa (JP)

(72) Inventors: Jiechen Lu, Kanagawa (JP); Kenji Ohara, Kanagawa (JP); Naonori Matsumura, Kanagawa (JP)

(73) Assignee: AESC JAPAN LTD., Kanagawa (JP)

( * ) Notice: Subject to any disclaimer, the term of this patent is extended or adjusted under 35 U.S.C. 154(b) by 627 days.

(21) Appl. No.: 18/250,444

(22) PCT Filed: Oct. 26, 2021

(86) PCT No.: PCT/JP2021/039517
§ 371 (c)(1),
(2) Date: Apr. 25, 2023

(87) PCT Pub. No.: WO2022/092094
PCT Pub. Date: May 5, 2022

(65) Prior Publication Data
US 2023/0402642 A1 Dec. 14, 2023

(30) Foreign Application Priority Data

Oct. 29, 2020 (JP) ................................. 2020-181185

(51) Int. Cl.
*H01M 10/04* (2006.01)
*H01M 50/14* (2021.01)
(Continued)

(52) U.S. Cl.
CPC ....... *H01M 10/0459* (2013.01); *H01M 50/14* (2021.01); *H01M 50/434* (2021.01);
(Continued)

(58) Field of Classification Search
CPC .......... H01M 10/0459; H01M 50/531; H01M 50/46; H01M 50/434; H01M 50/466; H01M 50/14
(Continued)

(56) References Cited

U.S. PATENT DOCUMENTS 10,270,069 B2 4/2019 Jo et al.
2015/0349375 A1* 12/2015 Takahashi ........... H01M 50/121
(Continued)

FOREIGN PATENT DOCUMENTS

JP 2008-084666 A 4/2008
JP 2013-254629 A 12/2013
(Continued)

*Primary Examiner* — James M Erwin
(74) *Attorney, Agent, or Firm* — Rankin, Hill & Clark LLP

(57) ABSTRACT

An outer edge of a negative electrode (200) covered with a first adhesive member (410) is substantially aligned with an outer edge of a positive electrode (100) covered with the first adhesive member (410) in a direction from a stacked body (10) toward the first adhesive member (410) or a direction from the first adhesive member (410) toward the stacked body (10). Specifically, the outer edge of the negative electrode (200) covered with the first adhesive member (410) is positioned within a distance equal to or more than 0% and equal to or less than 200% of a thickness of the negative electrode (200) from the outer edge of the positive electrode (100) covered with the first adhesive member (410) in the above direction.

10 Claims, 4 Drawing Sheets

(51) Int. Cl.

| | |
|---|---|
| H01M 50/434 | (2021.01) |
| H01M 50/46 | (2021.01) |
| H01M 50/466 | (2021.01) |
| H01M 50/531 | (2021.01) |

(52) U.S. Cl.
CPC ......... H01M 50/46 (2021.01); H01M 50/466 (2021.01); H01M 50/531 (2021.01)

(58) Field of Classification Search
USPC ........................................................ 429/211
See application file for complete search history.

(56) References Cited

U.S. PATENT DOCUMENTS

| 2017/0309871 | A1 | 10/2017 | Jo et al. | |
| 2018/0145376 | A1* | 5/2018 | Jo ....................... | H01M 50/461 |
| 2019/0190099 | A1* | 6/2019 | Katase ............... | H01M 10/654 |
| 2020/0243895 | A1 | 7/2020 | Zama et al. | |
| 2021/0043881 | A1* | 2/2021 | Wang ................... | H01M 50/116 |

FOREIGN PATENT DOCUMENTS

| JP | 2018-137066 | A | 8/2018 | | |
| JP | 2020-170636 | A | 10/2020 | | |
| WO | WO-2019064740 | A1 * | 4/2019 | .......... | H01M 50/451 |

* cited by examiner

FIG. 3                                                        10(B−B´)
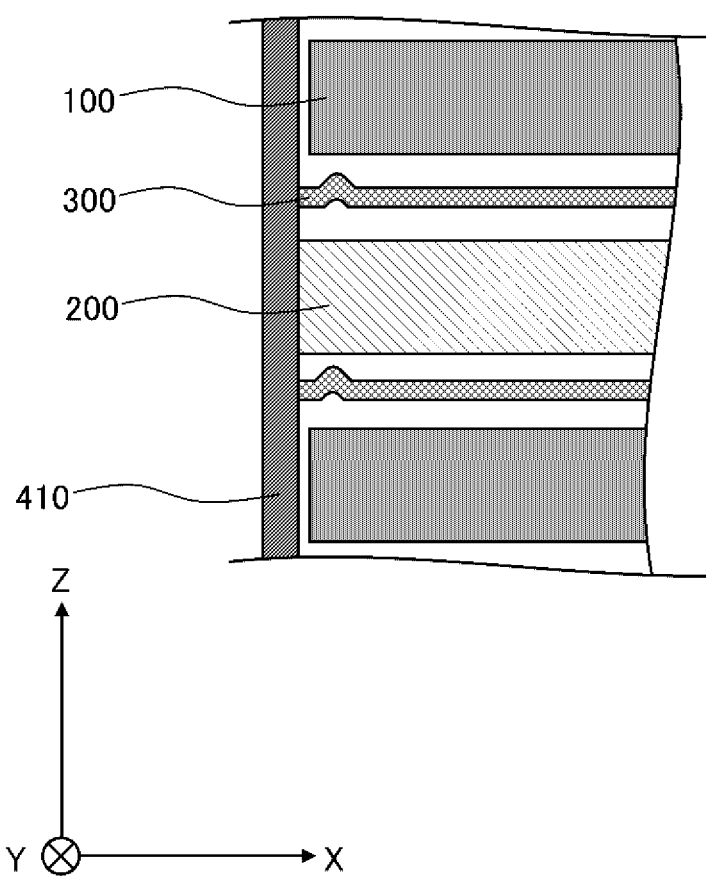
100
300
200
410
Z
Y ⊗ ──→ X FIG. 4                            10(B−B´)
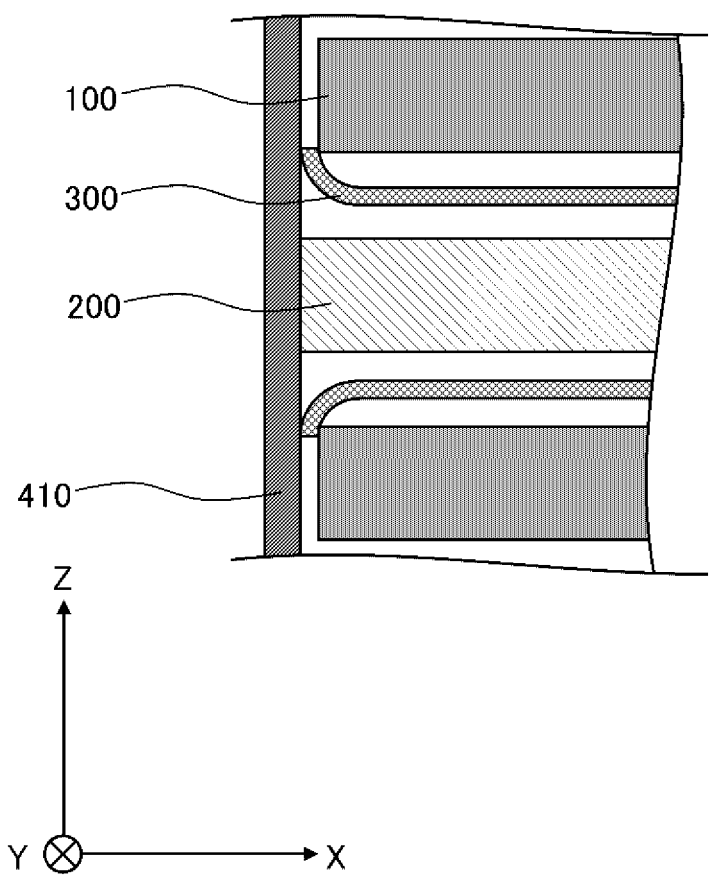
100
300
200
410
Z
Y ⊗       X

BATTERY

TECHNICAL FIELD

The present invention relates to a battery.

BACKGROUND ART

In recent years, a nonaqueous electrolyte battery such as a lithium-ion secondary battery has been developed. The battery includes a stacked body including a positive electrode, a negative electrode, and a separator. A positive electrode tab is connected to the positive electrode. A negative electrode tab is connected to the negative electrode. The separator separates the positive electrode and the negative electrode from each other.

Patent Document 1 describes that a tape is provided on a side surface of a stacked body. Specifically, a first tape is provided on a portion of the side surface of the stacked body directed to a side direction of a portion provided with a positive electrode tab and a negative electrode tab. A second tape is also provided on the portion of the side surface of the stacked body provided with the positive electrode tab and the negative electrode tab.

RELATED DOCUMENT

Patent Document

Patent Document 1: Japanese Patent Application Publication No. 2018-137066

SUMMARY OF INVENTION

Technical Problem

An area of a positive electrode and an area of a negative electrode may be different from each other. In this case, an outer edge of the positive electrode and an outer edge of the negative electrode offset from each other with the positive electrode and the negative electrode simply overlapping with each other. For this reason, even when an adhesive member such as a tape is provided on a side surface of a stacked body, the adhesive member cannot be adhered to one of the outer edge of the positive electrode and the outer edge of the negative electrode positioned on an inner side of the stacked body, and the adhesive member cannot be firmly adhered to the side surface of the stacked body.

One example of an object of the present invention is to firmly adhere an adhesive member to a side surface of a stacked body. Another object of the present invention will become apparent from the description in the present description.

Solution to Problem

One aspect of the present invention is a battery including:
a stacked body including a first electrode, a second electrode having an area larger than that of the first electrode, and a separator separating the first electrode and the second electrode from each other; and
a first adhesive member provided on a side surface of the stacked body, wherein
an outer edge of the second electrode covered with the first adhesive member is positioned within a distance equal to or more than 0% and equal to or less than 200% of a thickness of the second electrode from an outer edge of the first electrode covered with the first adhesive member in a direction from the stacked body toward the first adhesive member or a direction from the first adhesive member toward the stacked body.

Advantageous Effects of Invention

According to the above-described one aspect, an adhesive member can be firmly adhered to a side surface of a stacked body.

BRIEF DESCRIPTION OF THE DRAWINGS

FIG. 3 is a B-B' sectional view in FIG. 1.
FIG. 4 is a diagram illustrating a variant of FIG. 3.

DESCRIPTION OF EMBODIMENTS

Hereinafter, an embodiment of the present invention will be described with reference to the drawings. Note that, in all of the drawings, a similar constituent element is denoted by a similar reference sign, and description thereof will be appropriately omitted.

Figure 1:
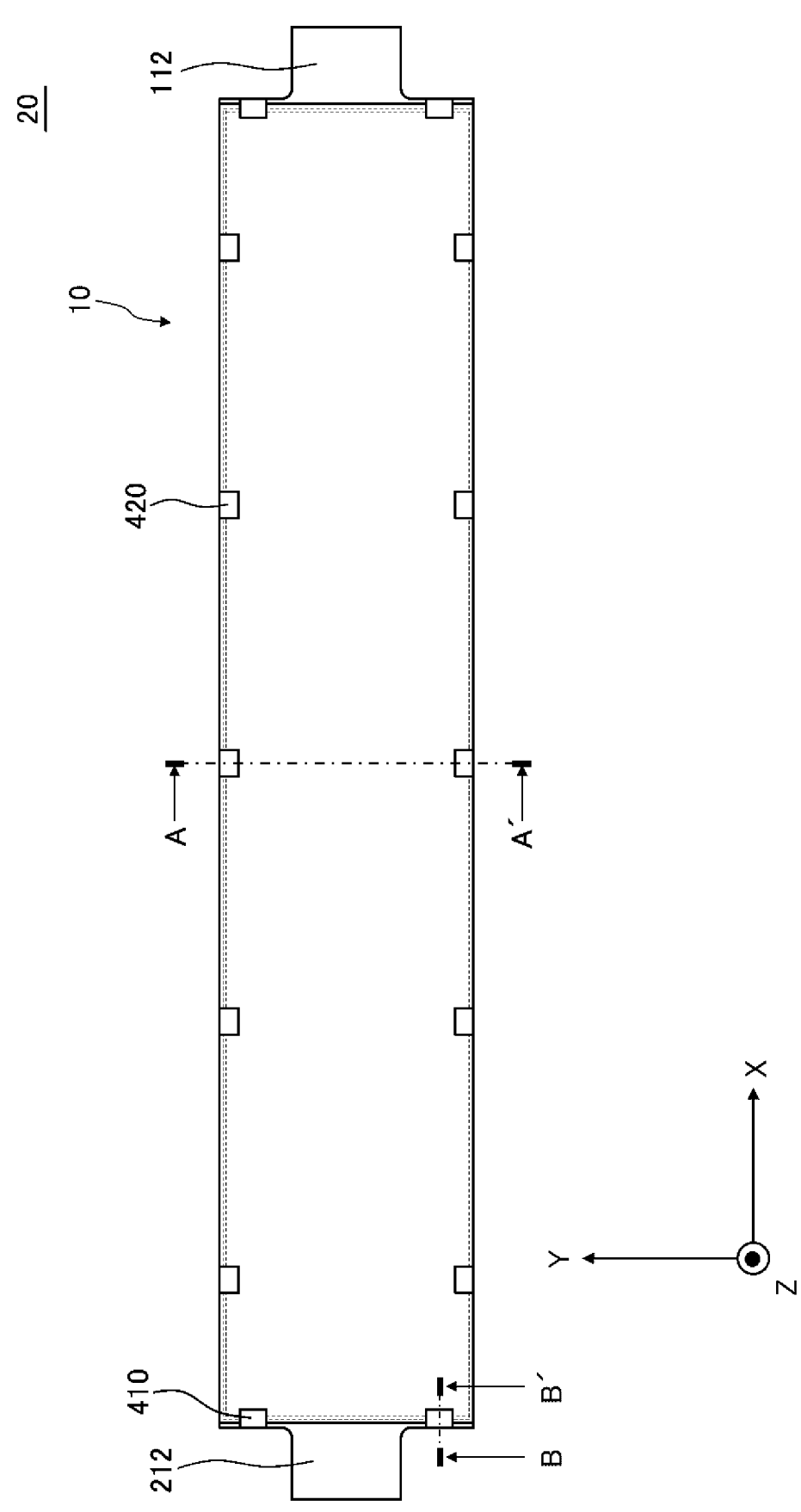
FIG. 1 is a plan view of a battery according to an embodiment.
Figure 2:
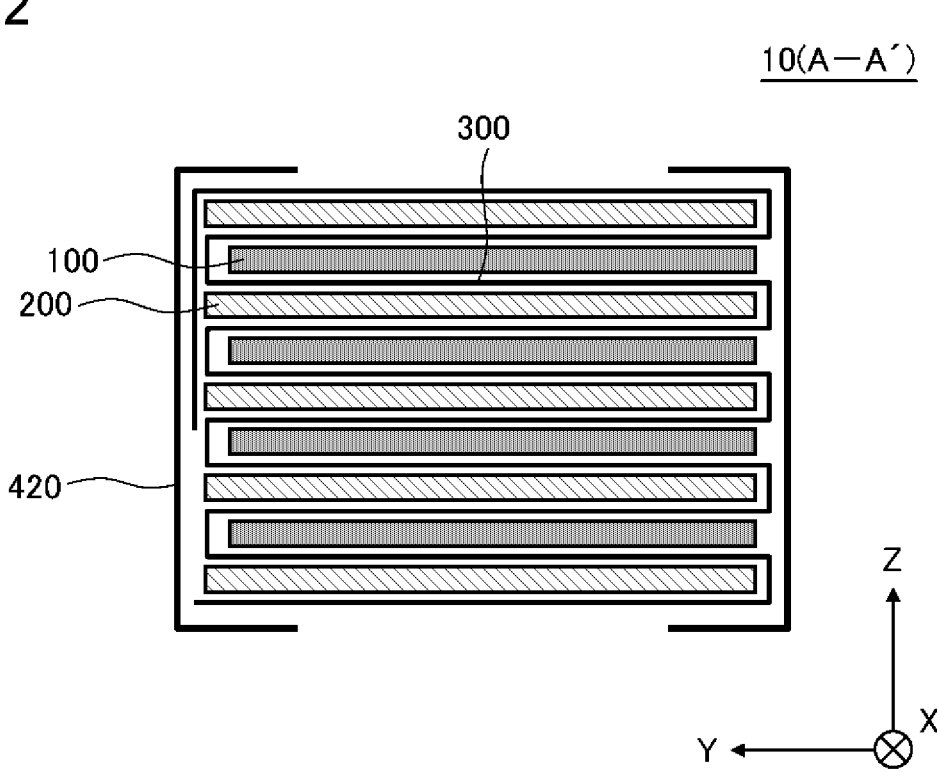
FIG. 2 is an A-A' sectional view in FIG. 1.

FIG. 1 is a plan view of a battery 20 according to the embodiment. FIG. 2 is an A-A' sectional view in FIG. 1. FIG. 3 is a B-B' sectional view in FIG. 1.

In FIGS. 1 to 3, a first direction X is a longitudinal direction of the battery 20. A positive direction of the first direction X being a direction indicated by an arrow indicating the first direction X is a direction from a negative electrode tab 212 toward a positive electrode tab 112. A negative direction of the first direction X being a direction opposite to the direction indicated by the arrow indicating the first direction X is a direction from the positive electrode tab 112 toward the negative electrode tab 212. A second direction Y intersects with, specifically is orthogonal to, the first direction X. The second direction Y is a width direction of the battery 20. A positive direction of the second direction Y being a direction indicated by an arrow indicating the second direction Y is a left direction of the battery 20 when viewed from a side on which the negative electrode tab 212 is positioned. A negative direction of the second direction Y being a direction opposite to the direction indicated by the arrow indicating the second direction Y is a right direction of the battery 20 when viewed from the side where the negative electrode tab 212 is positioned. A third direction Z intersects with, specifically is orthogonal to, both of the first direction X and the second direction Y. The third direction Z is a thickness direction of the battery 20. A positive direction of the third direction Z being a direction indicated by an arrow indicating the third direction Z is an upward direction of the battery 20. A negative direction of the third direction Z being a direction opposite to the direction indicated by the arrow indicating the third direction Z is a downward direction of the battery 20.

In FIG. 1, a white circle with a black dot indicating the third direction Z indicates that a direction from a back to a front of a paper sheet is the positive direction of the third direction Z, and a direction from the front to the back of the paper sheet is the negative direction of the third direction Z. In FIG. 2, a white circle with X indicating the first direction X indicates that a direction from the front to the back of the paper sheet is the positive direction of the first direction X, and a direction from the back to the front of the paper sheet is the negative direction of the first direction X. In FIG. 3, the white circle with X indicating the second direction Y indicates that a direction from the front to the back of the paper sheet is the positive direction of the second direction Y, and a direction from the back to the front of the paper sheet is the negative direction of the second direction Y.

Hereinafter, a "plane direction" is described as referring to a direction parallel to a plane including both of the first direction X and the second direction Y.

The battery 20 includes a stacked body 10, the positive electrode tab 112, the negative electrode tab 212, a first adhesive member 410, and a second adhesive member 420.

The stacked body 10 has a substantially rectangular cuboid shape. As illustrated in FIG. 2, the stacked body 10 includes a plurality of positive electrodes 100, a plurality of negative electrodes 200, and a separator 300. Each of the positive electrodes 100 and each of the negative electrodes 200 have a substantially rectangular shape. In the present embodiment, the positive electrode 100 is a first electrode, and the negative electrode 200 is a second electrode having an area larger than that of the first electrode. Specifically, as illustrated in FIG. 2, a length of the negative electrode 200 in the second direction Y is longer than a length of the positive electrode 100 in the second direction Y. An area of the positive electrode 100 or an area of the negative electrode 200 is an area of the positive electrode 100 or an area of the negative electrode 200 when viewed from the third direction Z.

As illustrated in FIG. 1, the positive electrode tab 112 is connected to each of a plurality of the positive electrodes 100. The positive electrode tabs 112 of each positive electrode 100 are drawn from a side surface of the stacked body 10 on the positive direction side in the first direction X, and are bundled with each other. The negative electrode tab 212 is also connected to each of a plurality of the negative electrodes 200. The negative electrode tabs 212 of each negative electrode 200 are drawn from a side surface of the stacked body 10 on the negative direction side in the first direction X, and are bundled with each other. Thus, the positive electrode tab 112 and the negative electrode tab 212 are positioned on opposite sides of the stacked body 10 in the first direction X. In this case, a distance between the positive electrode tab 112 and the negative electrode tab 212 can be greater, and a possibility of a short circuit between the positive electrode tab 112 and the negative electrode tab 212 can be less than when both of the positive electrode tab 112 and the negative electrode tab 212 are positioned on the same side of the stacked body 10. Both of the positive electrode tab 112 and the negative electrode tab 212 may be positioned on the same side of the stacked body 10, such as on the positive direction side or the negative direction side of the stacked body 10 in the first direction X.

A distance from a portion of the side surface of the stacked body 10 provided with the positive electrode tab 112 or the negative electrode tab 212 to an opposed portion thereof, i.e., a length of the stacked body 10 in the first direction X is longer than a distance from a portion of the side surface of the stacked body 10 directed to a side direction of the portion provided with the positive electrode tab 112 or the negative electrode tab 212 to an opposed portion thereof, i.e., a length of the stacked body 10 in the second direction Y. For example, the length of the stacked body 10 in the first direction X may be equal to or more than three times and equal to or less than six times the length of the stacked body 10 in the second direction Y. Alternatively, the length of the stacked body 10 in the first direction X may be equal to or more than three times and equal to or less than eight times the length of the stacked body 10 in the second direction Y. Alternatively, the length of the stacked body 10 in the first direction X may be equal to or more than three times and equal to or less than ten times the length of the stacked body 10 in the second direction Y. In this case, a relatively low-height battery module can be formed by configuring the battery module with a plurality of the stacked bodies 10 being arranged in a horizontal direction orthogonal to a vertical direction, and the second directions Y of the stacked bodies 10 being parallel to the vertical direction. The influence which the stacked body 10 receives by impact in the first direction X tends to be greater when a ratio of the length of the stacked body 10 in the first direction X to the length of the stacked body 10 in the second direction Y is greater. According to the present embodiment, however, the first adhesive member 410 can be firmly adhered to the side surface of the stacked body 10 as described later. The influence which the stacked body 10 receives by impact in the first direction X can be accordingly reduced even when a ratio of the length of the stacked body 10 in the first direction X to the length of the stacked body 10 in the second direction Y is relatively large. The length of the stacked body 10 in the first direction X may be equal to or less than the length of the stacked body 10 in the second direction Y.

As illustrated in FIG. 2, a plurality of the positive electrodes 100 and a plurality of the negative electrodes 200 are alternately arranged in the third direction Z. Each positive electrode 100 and each negative electrode 200 have a thickness in the third direction Z. The separator 300 separates the adjacent positive electrode 100 and negative electrode 200 from each other. Specifically, the separator 300 is folded and extends through between the adjacent positive electrode 100 and negative electrode 200. Thus, an outer edge of the positive electrode 100 on the positive direction side in the second direction Y is covered with a folded portion of the separator 300 on the positive direction side in the second direction Y, and an outer edge of the negative electrode 200 on the negative direction side in the second direction Y is covered with a folded portion of the separator 300 on the negative direction side in the second direction Y. For example, the separator 300 may include a base material layer including at least one resin such as polyolefin resin such as polypropylene (PP) and polyethylene (PE), and aramid resin, and a ceramic layer including at least one ceramic such as alumina ($Al_2O_3$) and boehmite (AlOOH). For example, the base material layer may be a single layer such as PP or PE, or may be three layers such as PP/PE/PP.

The first adhesive member 410 is provided on a portion of the side surface of the stacked body 10 directed to the same side as that of the portion provided with the positive electrode tab 112 or the negative electrode tab 212, i.e., on the portion on the positive direction side or the negative direction side in the first direction X. The first adhesive member 410 is a tape, for example. The offset between the positive electrode 100 and the negative electrode 200 in the first direction X can be more restricted when the first adhesive member 410 is provided than when the first adhesive member 410 is not provided. In the present embodiment, as illustrated in FIG. 1, the first adhesive members 410 are provided on both sides of the positive electrode tab 112 in the second direction Y, and on both sides of the negative electrode tab 212 in the second direction Y. A position where the first adhesive member 410 is provided is not limited to the position in the present embodiment. For example, the first adhesive members 410 may be provided on the portion of the side surface of the stacked body 10 on only one of the positive direction side and the negative direction side in the first direction X. The first adhesive member 410 may be provided on only one of both sides of the positive electrode tab 112 in the second direction Y, or on only one of both sides of the negative electrode tab 212 in the second direction Y. A plurality of the first adhesive members 410 may be provided on one of both sides of the positive electrode tab 112 in the second direction Y, or on one of both sides of the negative electrode tab 212 in the second direction Y.

The second adhesive member 420 is provided on a portion of the side surface of the stacked body 10 directed to a side direction of the portion provided with the positive electrode tab 112 or the negative electrode tab 212, i.e., on the portion on the positive direction side or the negative direction side in the second direction Y. The second adhesive member 420 is a tape, for example. The offset between the positive electrode 100 and the negative electrode 200 in the second direction Y can be more restricted when the second adhesive member 420 is provided than when the second adhesive member 420 is not provided. In the present embodiment, as illustrated in FIG. 1, a plurality of the second adhesive members 420 are arranged on the portion of the side surface of the stacked body 10 on the negative direction side in the second direction Y at substantially equal intervals along the first direction X, and a plurality of the second adhesive members 420 are arranged on the portion of the side surface of the stacked body 10 on the positive direction side in the second direction Y at substantially equal intervals along the first direction X. A position where the second adhesive member 420 is provided is not limited to the position in the present embodiment. For example, the second adhesive members 420 may be provided on the portion of the side surface of the stacked body 100 on only one of the positive direction side and the negative direction side in the second direction Y. There may be only one second adhesive member 420 provided on the portion of the side surface of the stacked body 10 on the positive direction side or the negative direction side in the second direction Y. The second adhesive member 420 may not be provided.

As illustrates in FIG. 3, the outer edge of the negative electrode 200 covered with the first adhesive member 410 is substantially aligned with the outer edge of the positive electrode 100 covered with the first adhesive member 410 in the first direction X, i.e., a direction from the stacked body 10 toward the first adhesive member 410 or a direction from the first adhesive member 410 toward the stacked body 10. Specifically, the outer edge of the negative electrode 200 covered with the first adhesive member 410 is positioned within a distance equal to or more than 0% and equal to or less than 200% of a thickness of the negative electrode 200 from the outer edge of the positive electrode 100 covered with the first adhesive member 410 in the first direction X. In this case, the first adhesive member 410 is more easily adhered to both of the outer edge of the positive electrode 100 and the outer edge of the negative electrode 200, and the first adhesive member 410 can be more firmly adhered to the side surface of the stacked body 10 than when the outer edge of the negative electrode 200 covered with the first adhesive member 410 is offset beyond the above-described range from the outer edge of the positive electrode 100 covered with the first adhesive member 410 in the first direction X. The offset between the positive electrode 100 and the negative electrode 200 in the plane direction can be more restricted accordingly than when the first adhesive member 410 is not provided.

For example, as illustrated in FIG. 3, the outer edge of the negative electrode 200 on the negative direction side in the first direction X covered with the first adhesive member 410 is offset within the above-described range from the outer edge of the positive electrode 100 on the negative direction side in the first direction X covered with the first adhesive member 410 toward the negative direction side in the first direction X. In the example illustrated in FIG. 3, an end portion of the separator 300 on the negative direction side in the first direction X contacts against the first adhesive member 410, and a part of the separator 300 is bent. The outer edge of the negative electrode 200 on the negative direction side in the first direction X covered with the first adhesive member 410 may be offset within the above-described range from the outer edge of the positive electrode 100 on the negative direction side in the first direction X covered with the first adhesive member 410 toward a positive direction side in the first direction X. Alternatively, the outer edge of the negative electrode 200 on the negative direction side in the first direction X covered with the first adhesive member 410 may be exactly aligned with the outer edge of the positive electrode 100 on the negative direction side in the first direction X covered with the first adhesive member 410 in the first direction X. In other words, the outer edge of the negative electrode 200 on the negative direction side in the first direction X covered with the first adhesive member 410 is positioned within a distance of 0% of a thickness of the negative electrode 200 from the outer edge of the positive electrode 100 on the negative direction side in the first direction X covered with the first adhesive member 410 in the first direction X.

As in the present embodiment where the length of the stacked body 10 in the first direction X is longer than the length of the stacked body 10 in the second direction Y, the positive electrode 100 and the negative electrode 200 are more easily offset from each other in the first direction X when the first adhesive member 410 is not provided than when with the first adhesive member 410 is provided. According to the present embodiment, the offset between the positive electrode 100 and the negative electrode 200 in the plane direction can be restricted even when the length of the stacked body in the first direction X is longer than the length of the stacked body 10 in the second direction Y.

As in the present embodiment where the separator 300 is folded and extend through between the adjacent positive electrode 100 and negative electrode 200, the positive electrode 100 and the negative electrode 200 are more easily offset from each other in the first direction X when the first adhesive member 410 is not provided than when the first adhesive member 410 is provided. According to the present embodiment, the offset between the positive electrode 100 and the negative electrode 200 in the plane direction can be restricted even when the separator 300 is folded and extends through between the adjacent positive electrode 100 and negative electrode 200.

The frictional force between the separator 300 and the positive electrode 100 or the negative electrode 200 is smaller when the separator 300 includes a ceramic than when the separator 300 does not include a ceramic. In the case where the separator 300 includes a ceramic, accordingly, the positive electrode 100 and the negative electrode 200 are more easily offset from each other in the plane direction when the first adhesive member 410 is not provided than when the first adhesive member 410 is provided. According to the present embodiment, the offset between the positive electrode 100 and the negative electrode 200 in the plane direction can be restricted even when the separator 300 includes a ceramic.

Next, one example of a method of manufacturing the battery 20 will be described.

First, the positive electrode 100 to which the positive electrode tab 112 is connected, and the negative electrode 200 to which the negative electrode tab 212 is connected are formed. At this time, the length of the negative electrode 200 in the first direction X is longer than the length of the positive electrode 100 in the first direction X by a certain length. For this reason, the offset in the first direction X between the outer edge of the positive electrode 100 and the outer edge of the negative electrode 200 on the positive direction side and the negative direction side in the first direction X is relatively large when the stacked body 10 is formed by using the positive electrode 100 and the negative electrode 200 in this time.

Next, portions of the negative electrode 200 on both sides of the negative electrode tab 212 in the second direction Y are removed by cutting or the like. In other words, a notch is provided to at least a portion of the outer edge of the negative electrode 200 covered with the first adhesive members 410. In this case, the offset between the portion of the outer edge of the positive electrode 100 covered with the first adhesive member 410 and the portion of the outer edge of the negative electrode 200 covered with the first adhesive member 410 in the first direction X when forming the stacked body 10 by using the positive electrode 100 and the negative electrode 200 can be made smaller than when the notches are not provided.

Next, a plurality of the positive electrodes 100 and a plurality of the negative electrodes 200 are overlap with one another with the separator 300 being folded and extending through between the adjacent positive electrodes 100 and negative electrodes 200. The stacked body 10 is formed accordingly.

Next, the first adhesive member 410 is provided on the side surface of the stacked body 10 on the positive direction side and on the negative direction side in the first direction X, and the second adhesive member 420 is provided on the side surface of the stacked body 10 on the positive direction side and on the negative direction side in the second direction Y. The outer edge of the positive electrode 100 on the positive direction side or the negative direction side in the first direction X and the outer edge of the negative electrode 200 on the positive direction side or the negative direction side in the first direction X can be substantially aligned along the first adhesive member 410 with more ease when the notches are provided in the outer edge of the negative electrode 200 than when the notches are not provided in the outer edge of the negative electrode 200.

The battery 20 is manufactured as described above.

The method of manufacturing the battery 20 is not limited to the above-described example. For example, the offset between the portion of the outer edge of the positive electrode 100 covered with the first adhesive member 410 and the portion of the outer edge of the negative electrode 200 covered with the first adhesive member 410 in the first direction X may be smaller by collectively removing the portions of a plurality of the negative electrodes 200 on both sides of the negative electrode tab 212 in the second direction Y after a plurality of the positive electrodes 100 and a plurality of the negative electrodes 200 overlap with one another to form the stacked body 10.

FIG. 4 is a diagram illustrating a variant of FIG. 3. As illustrated in FIG. 4, an end portion of the separator 300 on the negative direction side in the first direction X may be caught into and enter a gap between an end portion of the positive electrode 100 on the negative direction side in the first direction X and the first adhesive member 410. Also in the present variant, the outer edge of the negative electrode

200 covered with the first adhesive member 410 is positioned within the above-described range of the thickness of the negative electrode 200 from the outer edge of the positive electrode 100 covered with the first adhesive member 410 in the first direction X. In this case, the first adhesive member 410 is more easily adhered to both of the outer edge of the positive electrode 100 and the outer edge of the negative electrode 200, and the first adhesive member 410 can be more firmly adhered to the side surface of the stacked body 10 than when the outer edge of the negative electrode 200 covered with the first adhesive member 410 is offset beyond the above-described range from the outer edge of the positive electrode 100 covered with the first adhesive member 410 in the first direction X.

While the description has been made above on the embodiment of the present invention with reference to the drawings, these are exemplifications of the present invention, and various configurations other than those described above may also be employed.

For example, in the present embodiment, an area of the negative electrode 200 is larger than an area of the positive electrode 100. The area of the positive electrode 100 may be however larger than the area of the negative electrode 200. In other words, the negative electrode 200 may be the first electrode, and the positive electrode 100 may be the second electrode having an area larger than that of the first electrode.

In the present embodiment, the separator 300 is folded and extends through between the adjacent positive electrode 100 and negative electrode 200. A plurality of separators 300 may be provided however with each of the separators 300 being arranged between the adjacent positive electrode 100 and negative electrode 200.

In the present embodiment, the first adhesion member 410 is firmly adhered to the side surface of the stacked body 10 on the positive direction side or the negative direction side in the first direction X by substantially aligning the outer edge of the positive electrode 100 on the positive direction side or the negative direction side in the first direction X and the outer edge of the negative electrode 200 on the positive direction side or the negative direction side in the first direction X. When, however, the side surfaces of any one of a plurality of the positive electrodes 100 on the positive direction side and the negative direction side in the second direction Y, and the side surfaces of any one of a plurality of the negative electrodes 200 on the positive direction side and the negative direction side in the second direction Y are exposed from the separator 300 by providing a plurality of the separators 300 with each of the separators 300 being arranged between the adjacent positive electrode 100 and negative electrode 200, for example, the second adhesive member 420 may be firmly adhered to the side surface of the stacked body 10 on the positive direction side or the negative direction side in the second direction Y by substantially aligning the outer edge of the positive electrode 100 on the positive direction side or the negative direction side in the second direction Y and the outer edge of the negative electrode 200 on the positive direction side or the negative direction side in the second direction Y.

This application claims priority based on Japanese Patent Application No. 2020-181185 filed on Oct. 29, 2020, the disclosure of which is incorporated herein in its entirety.

REFERENCE SIGNS LIST

10 Stacked body
20 Battery

100 Positive electrode
112 Positive electrode tab
200 Negative electrode
212 Negative electrode tab
300 Separator
410 First adhesive member
420 Second adhesive member
X First direction
Y Second direction
Z Third direction
What is claimed is:

1. A battery comprising:
a stacked body including a plurality of first electrodes, a plurality of second electrodes each having an area larger than that of each of the plurality of first electrodes, and a separator separating adjacent first and second electrodes from each other, each of the plurality of first electrodes and each of the plurality of second electrodes being alternately arranged in a predetermined direction, the stacked body including a first side surface located on a first orthogonal direction orthogonal to the predetermined direction, wherein a tab connected to the first electrode or the second electrode is drawn from the first side surface; and
a first adhesive member provided on the first side surface of the stacked body, wherein
the first electrode includes a first outer edge that is covered with the first adhesive member and that is located on the first orthogonal direction,
the second electrode includes a second outer edge that is covered with the first adhesive member and that is located on the first orthogonal direction, and
the second outer edge of the second electrode is positioned within a distance equal to or more than 0% and equal to or less than 200% of a thickness of one of the plurality of second electrodes from the first outer edge of the first electrode in the first orthogonal direction.

2. The battery according to claim 1, wherein
the stacked body includes a second side surface located opposite to the first side surface, a third side surface located on one side of a second orthogonal direction orthogonal to the predetermined direction and the first orthogonal direction, and a fourth side surface located on the other side of the second orthogonal direction, and
a length of the stacked body from the first side surface to the second side surface is longer than a length of the stacked body from the third side surface to the fourth side surface.

3. The battery according to claim 1, wherein
the separator is folded and extends between adjacent first and second electrodes.

4. The battery according to claim 1, wherein
the separator includes a ceramic.

5. The battery according to claim 3, wherein
a tab connected to the first electrode is positioned on one of the first side surface or the second side surface, and
a tab connected to the second electrode is positioned on another of the first side surface or the second side surface.

6. The battery according to claim 3, further comprising
a second adhesive member provided on at least one of the third side surface or the fourth side surface of the stacked body.

7. The battery according to claim 1, wherein
the first electrode is a positive electrode, and the second electrode is a negative electrode.

8. The battery according to claim 1, wherein
the second outer edge of the second electrode is positioned within a distance equal to 0% of the thickness of the one of the plurality of second electrodes from the first outer edge of the first electrode in the first orthogonal direction.

9. The battery according to claim 1, wherein
an end portion of the separator on the first orthogonal direction contacts against the first adhesive member, and a part of the separator is bent.

10. The battery according to claim 1, wherein
an end portion of the separator on the first orthogonal direction is caught into and enters a gap between an end portion of the positive electrode on the first orthogonal direction and the first adhesive member.

* * * * *